United States Patent
Kim et al.

(10) Patent No.: US 9,860,031 B2
(45) Date of Patent: Jan. 2, 2018

(54) METHOD AND APPARATUS FOR DATA TRANSMISSION ON CONTROL CHANNELS FROM BASE STATION TO USER EQUIPMENTS IN WIRELESS COMMUNICATION SYSTEM

(71) Applicant: LG ELECTRONICS INC., Seoul (KR)

(72) Inventors: Kitae Kim, Seoul (KR); Jaehoon Chung, Seoul (KR); Jinmin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 8 days.

(21) Appl. No.: 14/776,123

(22) PCT Filed: Jan. 28, 2014

(86) PCT No.: PCT/KR2014/000787
§ 371 (c)(1),
(2) Date: Sep. 14, 2015

(87) PCT Pub. No.: WO2014/148736
PCT Pub. Date: Sep. 25, 2014

(65) Prior Publication Data
US 2016/0036569 A1    Feb. 4, 2016

Related U.S. Application Data

(60) Provisional application No. 61/802,753, filed on Mar. 18, 2013.

(51) Int. Cl.
*H04L 5/00* (2006.01)
*H04J 11/00* (2006.01)
(Continued)

(52) U.S. Cl.
CPC ........ *H04L 5/0005* (2013.01); *H04B 7/0617* (2013.01); *H04J 11/00* (2013.01);
(Continued)

(58) Field of Classification Search
CPC ...... H04L 5/0005; H04B 7/0617; H04J 13/00; H04W 72/0413
See application file for complete search history.

(56) References Cited

U.S. PATENT DOCUMENTS

| | | | |
|---|---|---|---|
| 9,161,348 B2 * | 10/2015 | Papasakellariou | .... H04L 1/0031 |
| 2004/0121809 A1 * | 6/2004 | Wallace | ............... H04B 7/0615 |
| | | | 455/562.1 |

(Continued)

FOREIGN PATENT DOCUMENTS

| | | |
|---|---|---|
| JP | 2013-255209 A | 12/2013 |
| WO | WO 2008/041110 A2 | 4/2008 |

(Continued)

OTHER PUBLICATIONS

Intel Corporation, "UE-RS Multiplexing for Multiple CCEs," 3GPP TSG RAN WG1 Meeting #68, R1-120816, Dresden, Germany, Feb. 6-10, 2012, 5 pages.

(Continued)

*Primary Examiner* — Warner Wong
(74) *Attorney, Agent, or Firm* — Birch, Stewart, Kolasch & Birch, LLP

(57) ABSTRACT

A method for data transmission on control channels from a Base Station (BS) to a User Equipment (UE) in a wireless communication system is disclosed. The method includes multiplexing a common control channel and a UE-specific control channel for the UE using at least one of time division multiplexing and frequency division multiplexing; and performing data transmission on the multiplexed common control channel and the UE-specific control channel to the (Continued)

UE. The UE-specific control channel is multiplexed with one or more UE-specific control channels for other UEs using at least one of time division multiplexing, frequency division multiplexing, spatial multiplexing, and code division multiplexing.

4 Claims, 18 Drawing Sheets

(51) Int. Cl.
*H04J 13/00* (2011.01)
*H04B 7/06* (2006.01)
*H04W 72/04* (2009.01)

(52) U.S. Cl.
CPC ............ *H04J 13/00* (2013.01); *H04L 5/0048* (2013.01); *H04L 5/0053* (2013.01); *H04W 72/0413* (2013.01)

(56) References Cited

U.S. PATENT DOCUMENTS

| | | | |
|---|---|---|---|
| 2004/0160933 A1* | 8/2004 | Odenwalder | H04J 13/0048 370/342 |
| 2008/0102875 A1* | 5/2008 | Shoji | H04W 52/42 455/522 |
| 2009/0213802 A1* | 8/2009 | Miki | H04B 7/2621 370/329 |
| 2011/0021228 A1 | 1/2011 | Kim et al. | |
| 2011/0268062 A1* | 11/2011 | Ji | H04L 5/0055 370/329 |
| 2012/0014297 A1 | 1/2012 | Tsai et al. | |
| 2012/0213163 A1* | 8/2012 | Lee | H04L 1/1861 370/329 |
| 2012/0300718 A1* | 11/2012 | Ji | H04L 5/0051 370/329 |
| 2012/0320806 A1* | 12/2012 | Ji | H04B 7/2656 370/280 |
| 2013/0051369 A1 | 2/2013 | Ko et al. | |
| 2013/0064196 A1 | 3/2013 | Gao et al. | |
| 2013/0114534 A1* | 5/2013 | Ji | H04W 72/0406 370/329 |
| 2013/0315184 A1* | 11/2013 | Kim | H04W 72/0406 370/329 |
| 2014/0119317 A1 | 5/2014 | Kim et al. | |
| 2014/0146765 A1* | 5/2014 | Ji | H04W 72/082 370/329 |
| 2015/0043476 A1* | 2/2015 | Takeda | H04L 5/0053 370/329 |
| 2015/0117353 A1 | 4/2015 | Takeda et al. | |

FOREIGN PATENT DOCUMENTS

| | | |
|---|---|---|
| WO | WO 2013/002528 A2 | 1/2013 |
| WO | WO 2013/024439 A1 | 2/2013 |
| WO | WO 2013/141214 A1 | 9/2013 |

OTHER PUBLICATIONS

LG Electronics, "Remaining Control Signaling Issues for Downlink MIMO," 3GPP TSG RAN WG 1 Meeting #53, R1-081811, Kansas City, USA, May 5-9, 2008, pp. 1-3.

NTT Docomo, "Enhanced PDCCH for DL MIMO in Rel-11," 3GPP TSG RAN WG1 Meeting #66bis, R1-113297, Zhuhai, China, Oct. 10-14, 2011, pp. 1-6.

Research in Motion et al., "Design Consideration for E-PDCCH," 3GPP TSG RAN WG1 Meeting #66bis, R1-113236, Zhuhai, China, Oct. 10-14, 2011, pp. 1-6.

Research in Motion et al., "Further Discussion on Reference Signals for E-PDCCH," 3GPP TSG RAN WG1 Meeting #68, R1-120332, Dresden, Germany, Feb. 6-10, 2012, pp. 1-5.

* cited by examiner (a) Control-plane protocol stack (b) User-plane protocol stack : Common PCH           : UE-specific PCH (a) SFBC (b) SFBC+FSTD : Common PCH      : UE-specific PCH (a) Spatial Multiplexing (b) OFDM-based single
Spatial Multiplexing (a) Spatial Multiplexing (b) OFDM-based single
Spatial Multiplexing

METHOD AND APPARATUS FOR DATA TRANSMISSION ON CONTROL CHANNELS FROM BASE STATION TO USER EQUIPMENTS IN WIRELESS COMMUNICATION SYSTEM

CROSS REFERENCE TO RELATED APPLICATIONS

This application is the National Phase of PCT International Application No. PCT/KR2014/000787, filed on Jan. 28, 2014, which claims priority under 35 U.S.C. 119(e) to U.S. Provisional Application No. 61/802,753, filed on Mar. 18, 2013, all of which are hereby expressly incorporated by reference into the present application.

TECHNICAL FIELD

The present invention relates to a wireless communication system, and more particularly, to a method and apparatus for data transmission on control channels from a Base Station (BS) to User Equipments (UEs) in a wireless communication system.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

An object of the present invention devised to solve the problem lies on a method and apparatus for data transmission on control channels from a Base Station (BS) to User Equipments (UEs) in a wireless communication system.

Technical Solution

The object of the present invention can be achieved by providing a method for data transmission on control channels from a Base Station (BS) to a User Equipment (UE) in a wireless communication system, the method including multiplexing a common control channel and a UE-specific control channel for the UE using at least one of time division multiplexing and frequency division multiplexing, and performing data transmission on the multiplexed common control channel and the UE-specific control channel to the UE, wherein the UE-specific control channel is multiplexed with one or more UE-specific control channels for other UEs using at least one of time division multiplexing, frequency division multiplexing, spatial multiplexing, and code division multiplexing.

The common control channel and the UE-specific control channel may be code-division-multiplexed or spatial-multiplexed on the same time-frequency resources. Alternatively, the common control channel and the UE-specific control channel may be neither code-division-multiplexed nor spatial-multiplexed on the same time-frequency resources.

The method may further include applying a precoder for transmit diversity to the common control channel, and applying a precoder for beamforming to the UE-specific control channel. In this case, the precoder for transmit diversity may use an identity matrix. Particularly, a Reference Signal (RS) configuration for estimating the common control channel may be different from the RS configuration for estimating the UE-specific control channel.

Alternatively, the method may further include applying a precoder for beamforming to the common control channel and the UE-specific control channel, and the precoder for beamforming may use an identity matrix. Here, an RS configuration for estimating the common control channel may be equal to the RS configuration for estimating the UE-specific control channel.

In another aspect of the present invention, provided herein is a Base Station (BS) apparatus in a wireless communication system, the apparatus including a wireless communication module for transmitting signals to and receiving signals from a User Equipment (UE), and a processor for multiplexing a common control channel and a UE-specific control channel for the UE using at least one of time division multiplexing and frequency division multiplexing, and controlling the wireless communication module to perform data transmission on the multiplexed common control channel and the UE-specific control channel to the UE, wherein the processor multiplexes the UE-specific control channel with one or more UE-specific control channels for other UEs using at least one of time division multiplexing, frequency division multiplexing, spatial multiplexing, and code division multiplexing.

The processor may code-division-multiplex or spatial-multiplex the common control channel and the UE-specific control channel on the same time-frequency resources. Alternatively, the processor may neither code-division-multiplex nor spatial-multiplex the common control channel and the UE-specific control channel on the same time-frequency resources.

The processor may apply a precoder for transmit diversity to the common control channel, and may apply a precoder for beamforming to the UE-specific control channel. In this case, the precoder for transmit diversity may use an identity matrix. Particularly, a Reference Signal (RS) configuration for estimating the common control channel may be different from the RS configuration for estimating the UE-specific control channel.

Alternatively, the processor may apply a precoder for beamforming to the common control channel and the UE-specific control channel, and the precoder for beamforming may use an identity matrix. Here, an RS configuration for estimating the common control channel may be equal to the RS configuration for estimating the UE-specific control channel.

Advantageous Effects

According to embodiments of the present invention, in a wireless communication system, a Base Station (BS) may more efficiently perform data transmission to User Equipments (UEs) on DownLink (DL) control channels in a high-frequency band.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

Figure 1:
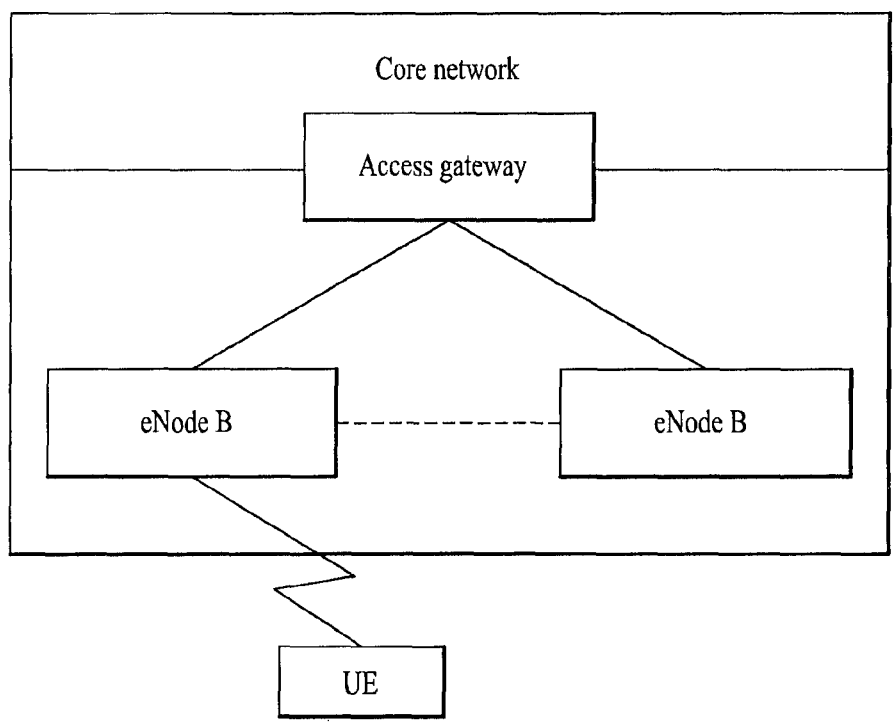
FIG. 1 illustrates a configuration of an Evolved Universal Mobile Telecommunications System (E-UMTS) network as an example of a wireless communication system.
Figure 2:
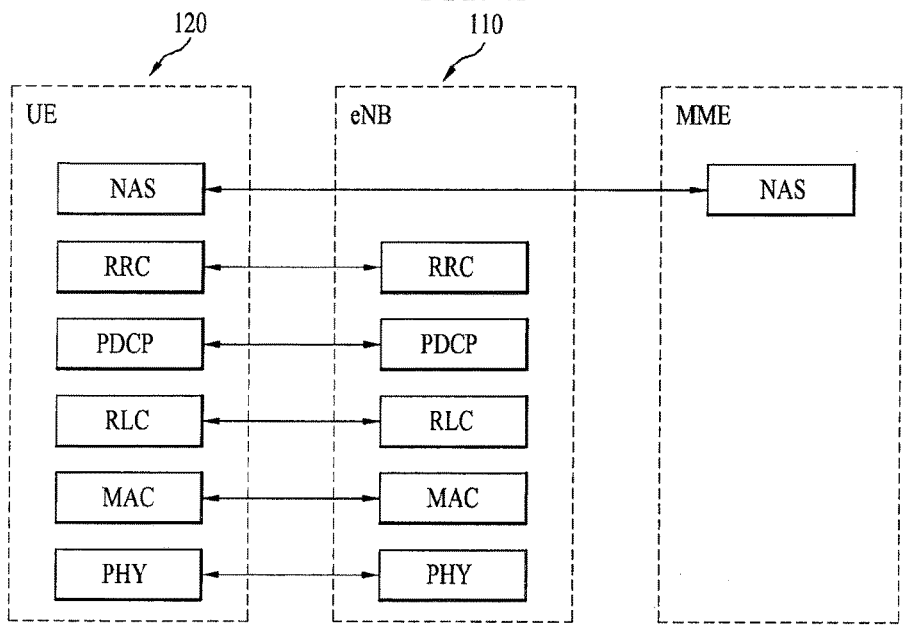
FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN)
Figure 2:
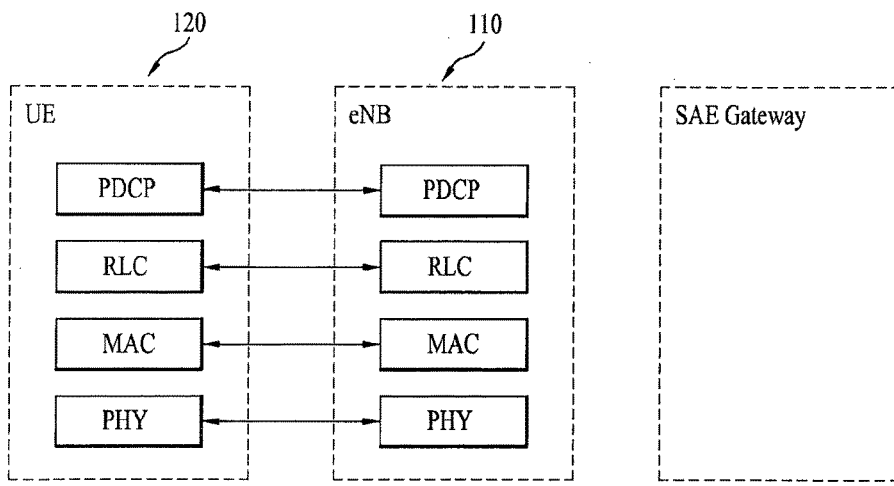

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

A cell managed by an eNB is set to operate in one of the bandwidths of 1.4, 3, 5, 10, 15 and 20 Mhz and provides DL or UL transmission service to a plurality of UEs in the bandwidth. Different cells may be configured so as to provide different bandwidths.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
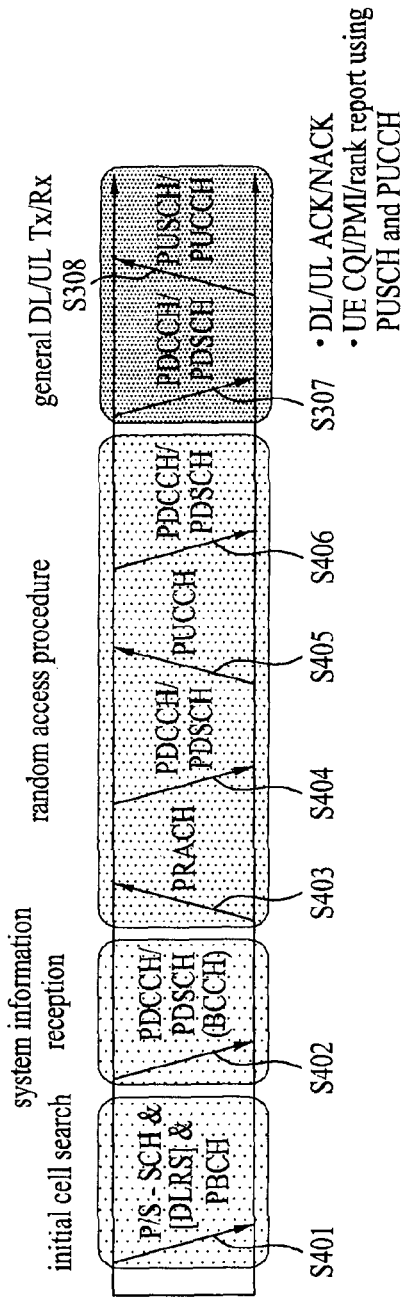
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Now a description will be given of a MIMO system. MIMO can increase the transmission and reception efficiency of data by using a plurality of Transmission (Tx) antennas and a plurality of Reception (Rx) antennas. That is, with the use of multiple antennas at a transmitter or a receiver, MIMO can increase capacity and improve performance in a wireless communication system. The term "MIMO" is interchangeable with 'multi-antenna'.

The MIMO technology does not depend on a single antenna path to receive a whole message. Rather, it completes the message by combining data fragments received through a plurality of antennas. MIMO can increase data rate within a cell area of a predetermined size or extend system coverage at a given data rate. In addition, MIMO can find its use in a wide range including mobile terminals, relays, etc.

MIMO can overcome a limited transmission capacity encountered with the conventional single-antenna technology in mobile communication.

Figure 4:
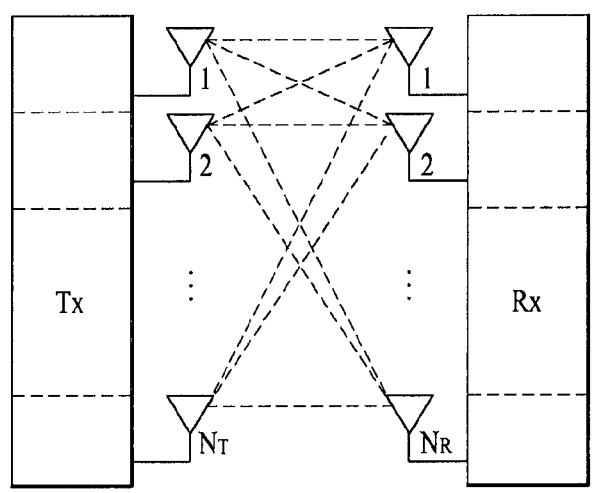
FIG. 4 illustrates a configuration of a general Multiple Input Multiple Output (MIMO) communication system.

FIG. 4 illustrates the configuration of a typical MIMO communication system. Referring to FIG. 4, a transmitter has $N_T$ Tx antennas and a receiver has $N_R$ Rx antennas. The use of a plurality of antennas at both the transmitter and the receiver increases a theoretical channel transmission capacity, compared to the use of a plurality of antennas at only one of the transmitter and the receiver. The channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas. $R_i$ is the smaller value between $N_T$ and $N_R$.

$$R_i = \min(N_T, N_R)$$ [Equation 1]

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards such as standards for 3G mobile communications, future-generation Wireless Local Area Network (WLAN), etc.

Concerning the research trend of MIMO up to now, active studies are underway in many aspects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Figure 7:
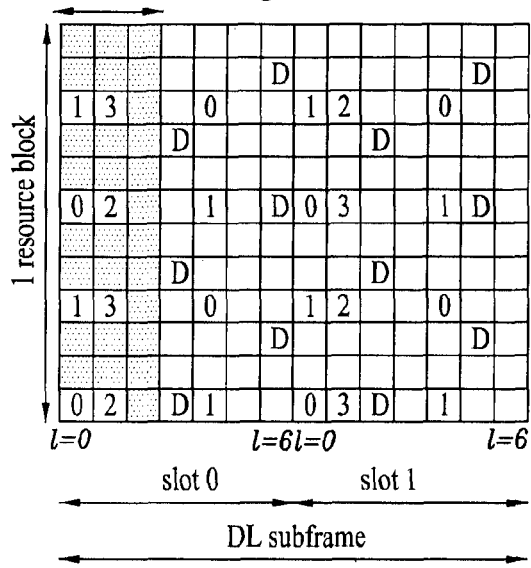
FIGS. 7 and 8 illustrate downlink Reference Signal (RS) configurations in an LTE system supporting downlink transmission through four antennas (4-Tx downlink transmission)

Communication in a MIMO system with $N_T$ Tx antennas and $N_R$ Rx antennas as illustrated in FIG. 7 will be described in detail through mathematical modeling. Regarding a transmission signal, up to $N_T$ pieces of information can be transmitted through the $N_T$ Tx antennas, as expressed as the following vector.

$$s = [s_1, s_2, \ldots, s_{N_T}]^T$$ [Equation 2]

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T$$ [Equation 3]

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps$$ [Equation 4]

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals, $x_1, x_2, \ldots, x_{N_T}$ are represented as a vector X, which may be determined by [Equation 5]. Herein, $w_{ij}$ denotes a weight between a $j^{th}$ piece of information and an $i^{th}$ Tx antenna and W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \vdots \\ w_{i1} & w_{i2} & \ldots & w_{iN_T} \\ \vdots & & \ddots & \vdots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$ [Equation 5]

In general, the rank of a channel matrix is the maximum number of different pieces of information that can be transmitted on a given channel, in its physical meaning. Therefore, the rank of a channel matrix is defined as the smaller between the number of independent rows and the number of independent columns in the channel matrix. The rank of the channel matrix is not larger than the number of rows or columns of the channel matrix. The rank of a channel matrix H, rank(H) satisfies the following constraint.

$$\text{rank}(H) \leq \min(N_T, N_R)$$ [Equation 6]

A different piece of information transmitted in MIMO is referred to as 'transmission stream' or shortly 'stream'. The 'stream' may also be called 'layer'. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R)$$ [Equation 7]

"# of streams" denotes the number of streams. One thing to be noted herein is that one stream may be transmitted through one or more antennas.

One or more streams may be mapped to a plurality of antennas in many ways. The stream-to-antenna mapping may be described as follows depending on MIMO schemes. If one stream is transmitted through a plurality of antennas, this may be regarded as spatial diversity. When a plurality of streams are transmitted through a plurality of antennas, this may be spatial multiplexing. Needless to say, a hybrid scheme of spatial diversity and spatial multiplexing in combination may be contemplated.

Figure 5:
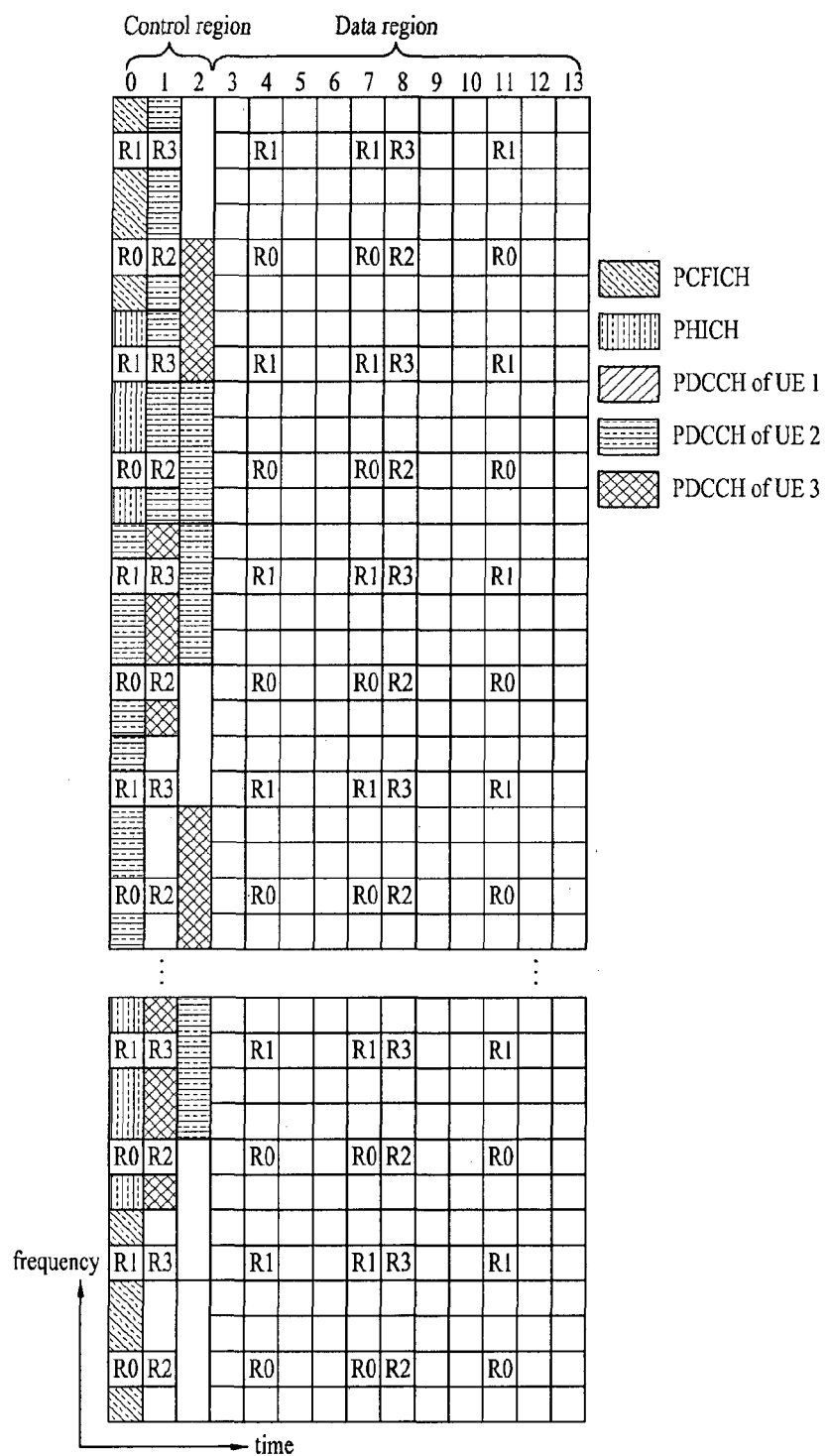
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
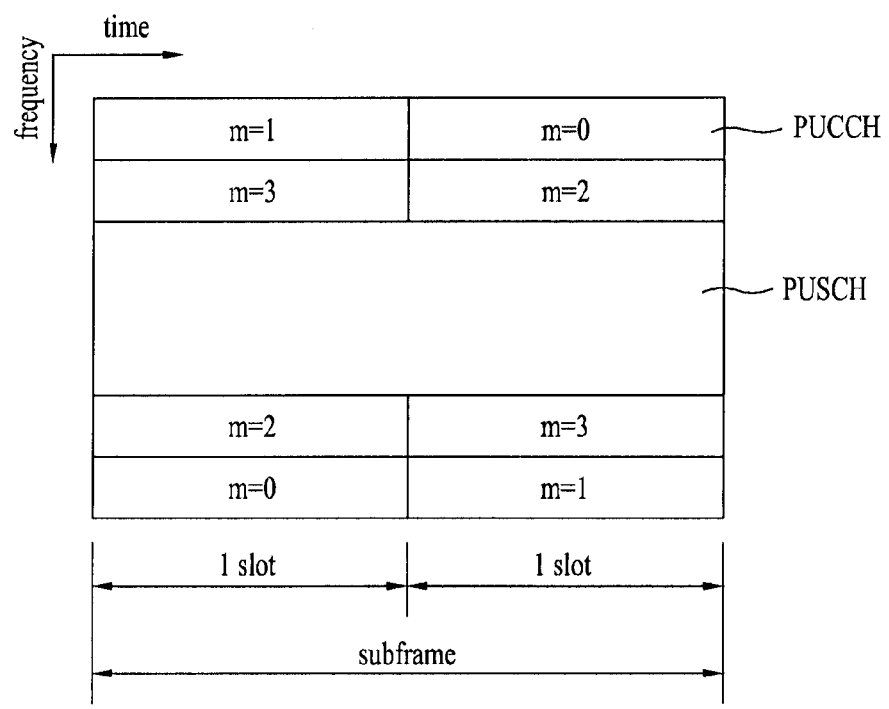
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Now a detailed description will be given of RS.

In general, a transmitter transmits an RS known to both the transmitter and a receiver along with data to the receiver so that the receiver may perform channel measurement in the RS. The RS indicates a modulation scheme for demodulation as well as the RS is used for channel measurement. The RS is classified into Dedicated RS (DRS) for a specific UE (i.e. UE-specific RS) and Common RS (CRS) for all UEs within a cell (i.e. cell-specific RS). The cell-specific RS includes an RS in which a UE measures a CQI/PMI/RI to be reported to an eNB. This RS is referred to as Channel State Information-RS (CSI-RS).

Figure 8:
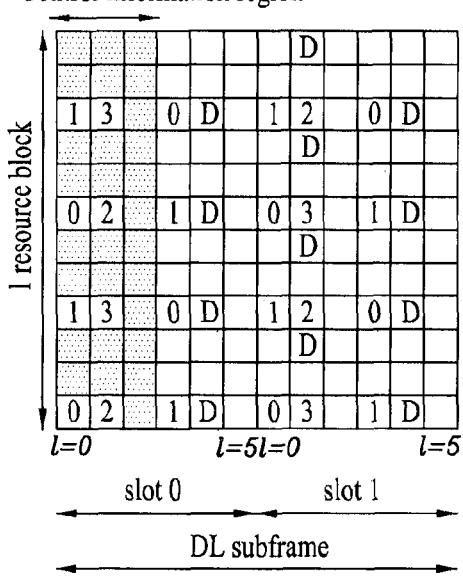

FIGS. 7 and 8 illustrate RS configurations in an LTE system supporting DL transmission through four antennas (4-Tx DL transmission). Specifically, FIG. 7 illustrates an RS configuration in the case of a normal CP and FIG. 8 illustrates an RS configuration in the case of an extended CP.

Referring to FIGS. 7 and 8, reference numerals 0 to 3 in grids denote cell-specific RSs, CRSs transmitted through antenna port 0 to antenna port 3, for channel measurement and data modulation. The CRSs may be transmitted to UEs across a control information region as well as a data information region.

Reference character D in grids denotes UE-specific RSs, Demodulation RSs (DMRSs). The DMRSs are transmitted in a data region, that is, on a PDSCH, supporting single-antenna port transmission. The existence or absence of a UE-specific RS, DMRS is indicated to a UE by higher-layer signaling. In FIGS. 7 and 8, the DMRSs are transmitted through antenna port 5. 3GPP TS 36.211 defines DMRSs for a total of eight antenna ports, antenna port 7 to antenna port 14.

Figure 9:
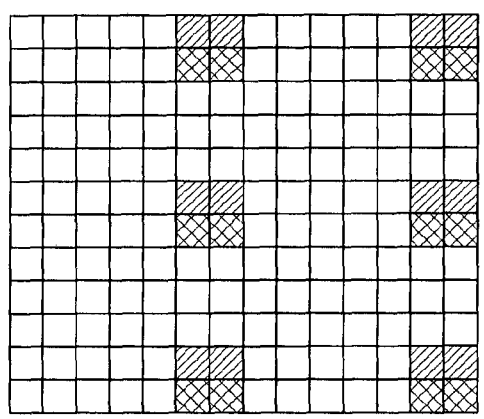
FIG. 9 illustrates an exemplary downlink Demodulation Reference Signal (DMRS) allocation defined in a current 3GPP standard specification.
Figure 10:
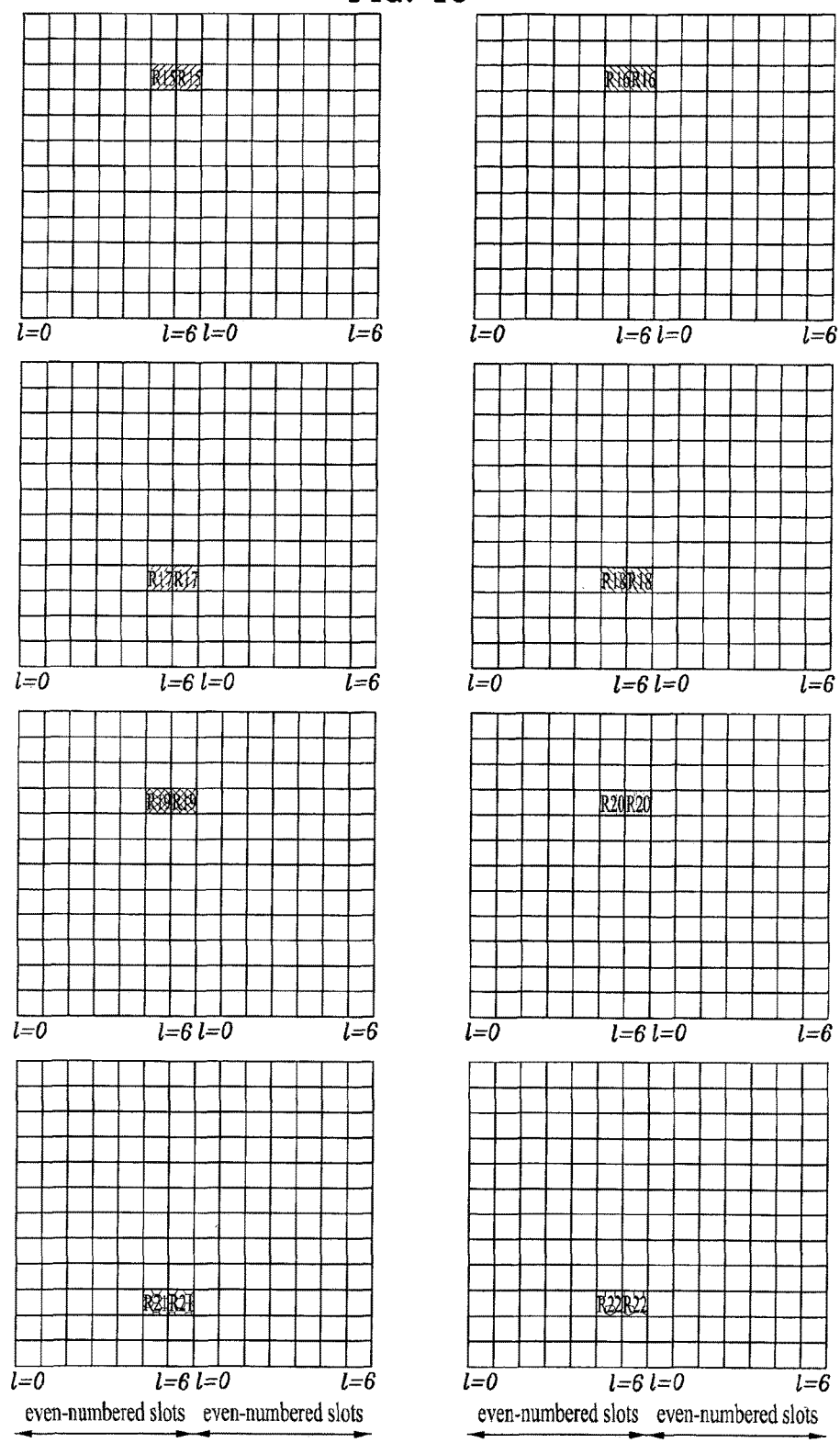
FIG. 10 illustrates Channel State Information-Reference Signal (CSI-RS) configuration #0 of downlink CSI-RS structures defined in a current 3GPP standard specification.

FIG. 9 illustrates an exemplary DL DMRS allocation defined in a current 3GPP standard specification.

Referring to FIG. 9, DMRSs for antenna ports 7, 8, 11, and 13 are mapped using sequences for the respective antenna ports in a first DMRS group (DMRS Group 1), whereas DMRSs for antenna ports 9, 10, 12, and 14 are mapped using sequences for the respective antenna ports in a second DMRS group (DMRS Group 2).

As compared to CRS, CSI-RS was proposed for channel measurement of a PDSCH and up to 32 different resource configurations are available for CSI-RS to reduce Inter-Cell Interference (ICI) in a multi-cellular environment.

A different CSI-RS (resource) configuration is used according to the number of antenna ports and adjacent cells transmit CSI-RSs according to different (resource) configurations, if possible. Unlike CRS, CSI-RS supports up to eight antenna ports and a total of eight antenna ports from antenna port 15 to antenna port 22 are allocated to CSI-RS in the 3GPP standard. [Table 1] and [Table 2] list CSI-RS configurations defined in the 3GPP standard. Specifically, [Table 1] lists CSI-RS configurations in the case of a normal CP and [Table 2] lists CSI-RS configurations in the case of an extended CP.

TABLE 1

| CSI reference signal configuration | | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2

| CSI reference signal configuration | | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 11:
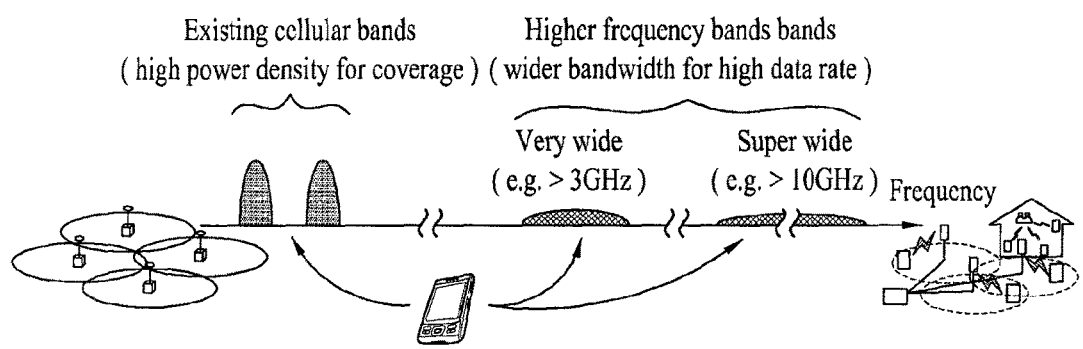
FIG. 11 illustrates the concept of small cells to be introduced in the LTE system.

In [Table 1] and [Table 2], (k', l') represents an RE index where k' is a subcarrier index and l' is an OFDM symbol index. FIG. 11 illustrates CSI-RS configuration #0 of DL CSI-RS configurations defined in the current 3GPP standard.

In addition, CSI-RS subframe configurations may be defined, each by a periodicity in subframes, $T_{CSI-RS}$ and a subframe offset $\Delta_{CSI-RS}$ [Table 3] lists CSI-RS subframe configurations defined in the 3GPP standard.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Introduction of a local area in the LTE system is under consideration. That is, in order to enhance services provided to individual users, introduction of new cell deployment in a concept of local area access is expected.

FIG. 11 illustrates the concept of small cells to be introduced in the LTE system.

Referring to FIG. 11, it is expected to form and use higher frequency bands and wider system bands compared to frequency bands used in the existing LTE system. Alternatively, basic cell coverage based on control signals, e.g., system information, may be supported by existing cellular bands, and data transmission with maximized transmission efficiency may be performed in small high-frequency cells using wider frequency bands. Therefore, the concept of local area access is for low-to-medium mobility UEs located in a narrower region, and for small cells in which the distance between a UE and an eNB is within a few hundred meters rather than a few kilometers as in general cells.

In these small cells, since the distance between the UE and the eNB is reduced and high-frequency bands are used, the following channel characteristics are expected.

In terms of delay spread, since the distance between the eNB and the UE is reduced, delay of a signal may also be reduced. In terms of subcarrier spacing, when OFDM-based frames are used as in the LTE system, since allocated frequency bands are relatively large, an extremely large value greater than 15 kHz corresponding to general subcarrier spacing may be set. Besides, in terms of Doppler frequency, since high-frequency bands are used, Doppler frequencies higher than those of low-frequency bands having the same UE speed occur, and thus a coherent time may be extremely short. Here, the coherent time refers to a time period when a channel has temporally static or uniform characteristics. A coherent bandwidth refers to a bandwidth where a channel has temporally static or uniform characteristics.

Now a detailed description will be given of control channels in an existing LTE system.

Figure 12:
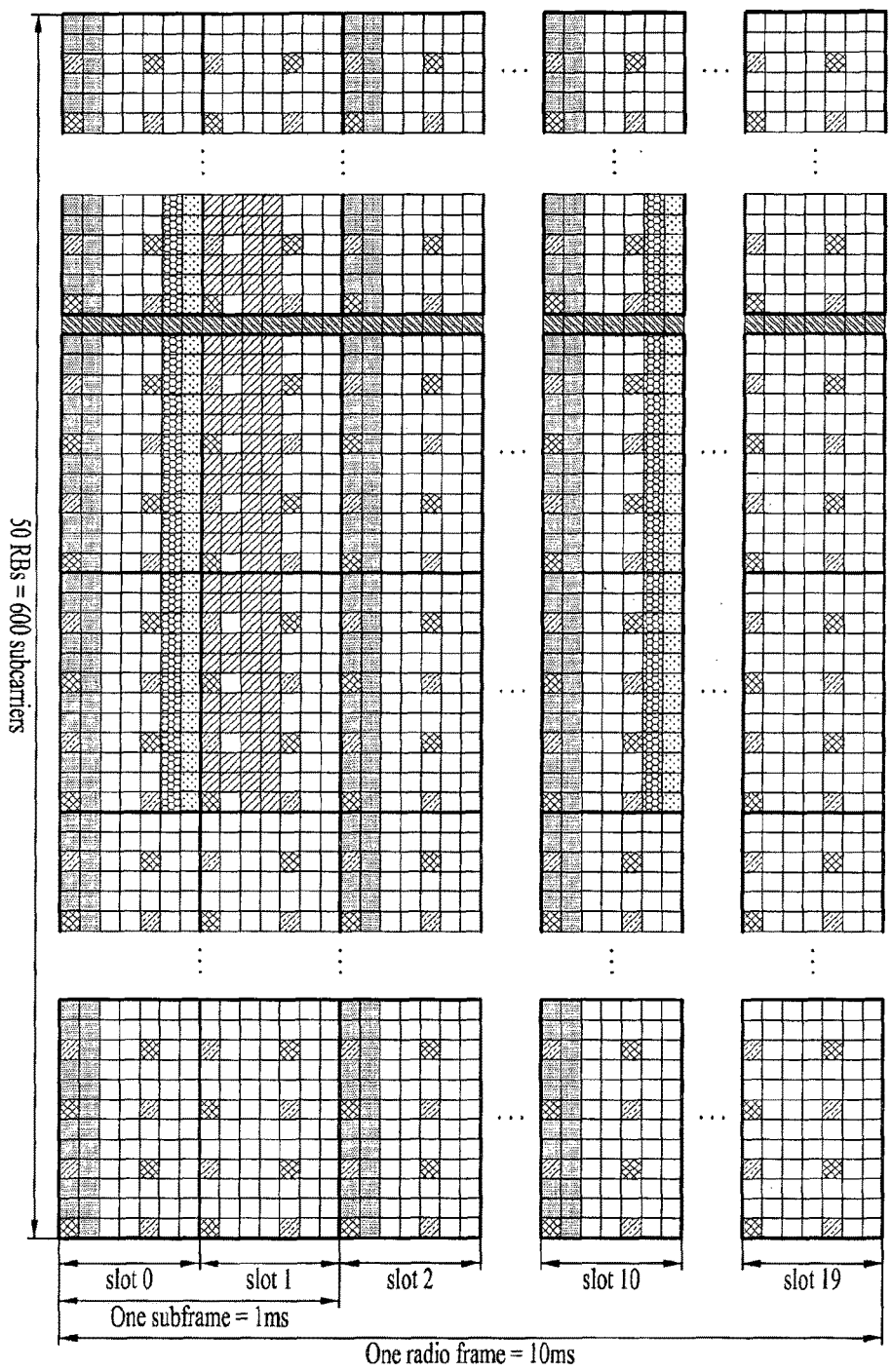
FIG. 12 illustrates structures of physical regions of a PBCH and a Physical Downlink Control Channel (PDCCH) in the LTE system.

In the LTE system, control channels used to deliver information to UEs are classified into two types according to the content of the information as illustrated in FIG. 12.

FIG. 12 illustrates structures of physical regions of a PBCH and a Physical Downlink Control Channel (PDCCH) in the LTE system. Specifically, it is assumed that a system bandwidth is 10 MHz in FIG. 12.

Referring to FIG. 12, system information transmitted from an eNB to UEs is the most basic information and is received on the PBCH. The system information transmitted on the PBCH is information to be essentially obtained when the UE initially accesses a network, for example, a Down-Link BandWidth (DL BW) of the UE, an initial access parameter, and a System Frame Number (SFN), and the PBCH delivers the information in units of 40 ms after DL synchronization signals, a Primary Synchronization Signal (PSS) and a Secondary Synchronization Signal (SSS).

However, since self-decoding is enabled using only information obtained in a cycle of 10 ms, eventually, 2-bit SFN information is provided in an implicit form on the PBCH. Other types of the system information are received on the PDCCH region of the UE.

The PDCCH region of FIG. 12 is logically divided into a common search space and a UE-specific search space, and the PDCCH corresponding to the common search space includes scheduling information of a data channel having the system information.

Individual scheduling information of the UE is allocated to the UE-specific search space of the PDCCH and the UE obtains the same via blind decoding using a predetermined identifier assigned to the UE.

The above-described existing control channels may not be easily applicable to data transmission in a high-frequency band.

Only a UE who has completed data transmission on the PBCH and the PDCCH obtains common control channel information, and blind decoding of the PDCCH should be performed again to obtain individual scheduling information of the UE. In addition, since different physical channels are used for data transmission, different channel estimation algorithms are required. A detailed description thereof will now be given with reference to the drawings.

Figure 13:
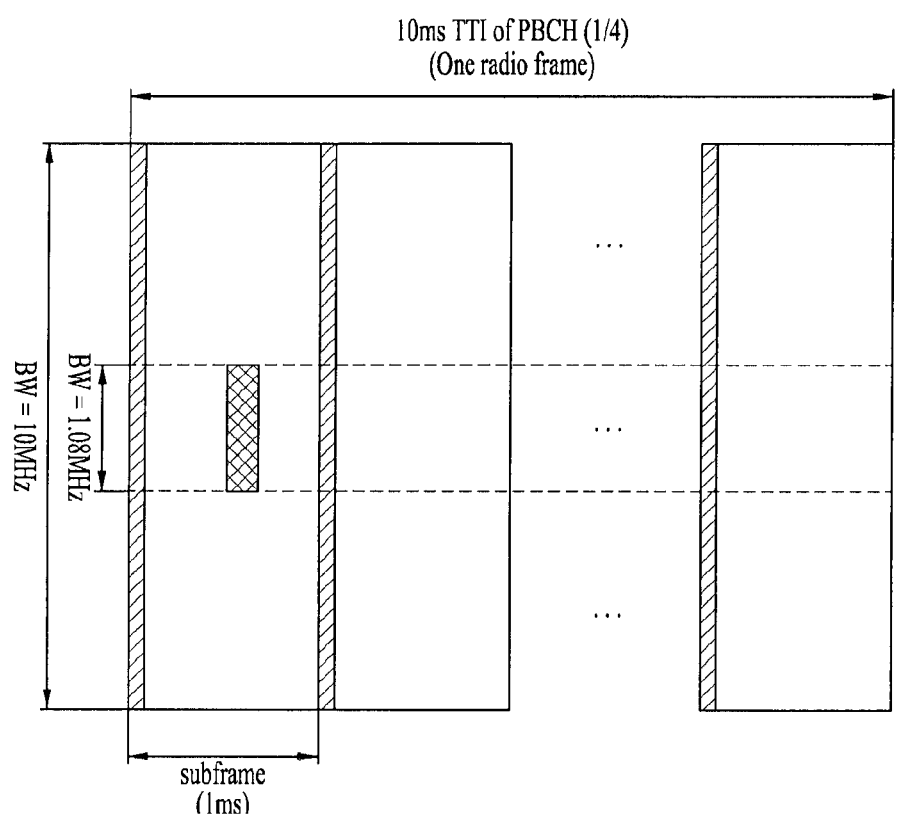
FIG. 13 is a conceptual view showing physical region allocation and data transmission on the PBCH and PDCCH in an existing LTE system.

FIG. 13 is a conceptual view showing physical region allocation and data transmission on the PBCH and PDCCH in an existing LTE system.

Referring to FIG. 13, since the PBCH performs data transmission in only a part of the whole band, has a low coding rate of ⅟₄₈, and carries only small amounts of information, the efficiency thereof may be low in comparison to the frequency in reception by the UE. For reference, the coding rate of ⅟₄₈ is calculated because 1920 bits are calculated by combining and then encoding 14 bits as information bits included in the PBCH, 10 bits as spare bits, and 16 bits as CRC bits.

Unlike the PBCH of FIG. 13, the PDCCH performs data transmission to achieve maximum frequency diversity over the whole transmission band. Therefore, the UE should always perform channel estimation on the whole transmission band. However, in a high-frequency band, instead of 20 MHz corresponding to a maximum transmission band of each carrier in the existing LTE system, since a transmission band is designed to use a few hundred MHz as a single band, complexity and load of channel estimation of the UE are correspondingly increased. In addition, since transmission power of an eNB for each subcarrier is lowered due to transmission power limitations, detection performance of the UE may be reduced. If a maximum transmission power of the eNB is lower compared to a general macro cell, the detection performance of the UE may be further reduced.

Furthermore, in the LTE-A standard, how to increase efficiency of the existing control channel, namely the PDCCH, is under discussion. This control channel is referred to as an Enhanced PDCCH (EPDCCH). The frequency diversity of a UE that receives control information is restricted, but the efficiency of resources may be increased and cell interference between control channels may be easily controlled.

Now a proposal will be given for a structure of a control channel appropriate for data transmission in a high-frequency wideband and adopting a single physical control channel structure differently from the existing control channel.

That is, the following proposal is ultimately for maximum use of frequency resources by transmitting system information and individual scheduling control information of each UE on the same-type physical channels and applying a multiplexing scheme appropriately for each cell.

In the following description, a common control channel and a UE-specific control channel are defined as described below.

1) Common control channel: a channel used to deliver system information from an eNB commonly to UEs 2) UE-specific control channel: a channel used to deliver scheduling-related information from the eNB individually to each UE The common control channel may carry system information related to a transmission band, random access, UL configuration information, RRC information, handover information, etc. In addition, the common control channel may also carry resource allocation information of the UEs, information for applying a multiple antenna scheme, measurement-related information for feedback, etc.

Embodiment 1

In the first embodiment of the present invention, it is proposed to design the common control channel and the UE-specific control channel to have the same physical channel structure. That is, a physical channel used to deliver common information of UEs, system information and a physical channel used to deliver individual control information of the UEs (e.g., assignment, scheduling information) are formed to have the same structure.

Figure 14:
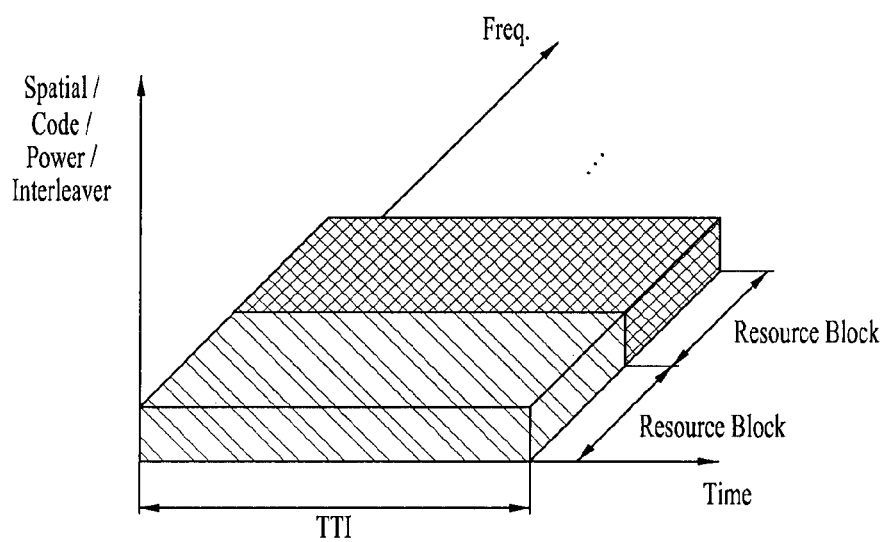
FIG. 14 illustrates an example wherein a common control channel and a UE-specific control channel are formed to have the same physical channel structure, according to a first embodiment of the present invention.
Figure 14:
Figure 14:

FIG. 14 illustrates an example wherein the common control channel and the UE-specific control channel are formed to have the same physical channel structure, according to the first embodiment of the present invention. Referring to FIG. 14, the common control channel and the UE-specific control channel have the same physical channel structure and are frequency-division-multiplexed.

A unique ID may be given to each UE to check whether the UE detects control channels. The ID may be reflected in the form of CRC bits when control information is generated and thus the UE may detect only control channels thereof. However, since the common control channel carries control information that should be received and detected by all UEs, the same or a fixed ID may be given to all UEs in a cell.

According to the first embodiment of the present invention, since control channels have the same physical channel structure, the same RS configuration is applicable. Therefore, if the UE includes only a single channel estimator, all data channels may be detected.

In addition, when data transmission is performed on the common control channel and the UE-specific control channel according to the first embodiment of the present invention, two different RS configurations may be used according to the accuracy of channel estimation of the UE.

That is, in the case of the common control channel that carries information that should be received commonly by all UEs, if a transmit diversity scheme is applied, the accuracy of reception detection of the UE may be improved. On the other hand, in the case of the UE-specific control channel, beam gain may be maximized by applying a beamforming scheme. In such a case, the control channels may have different RS configurations.

Figure 15:
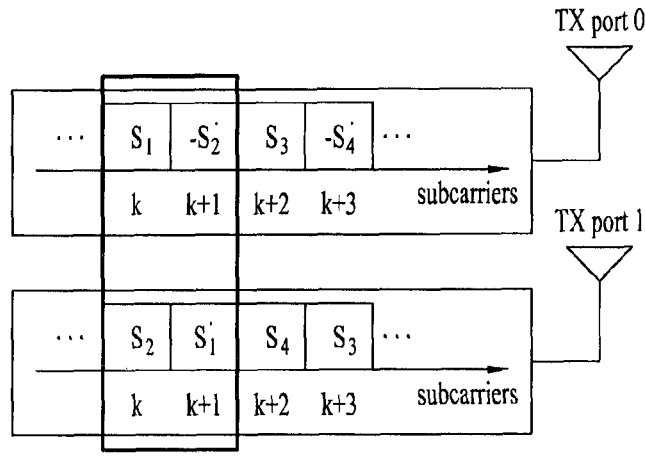
FIG. 15 illustrates transmit diversity schemes for the common control channel, applicable to the first embodiment of the present invention.
Figure 15:
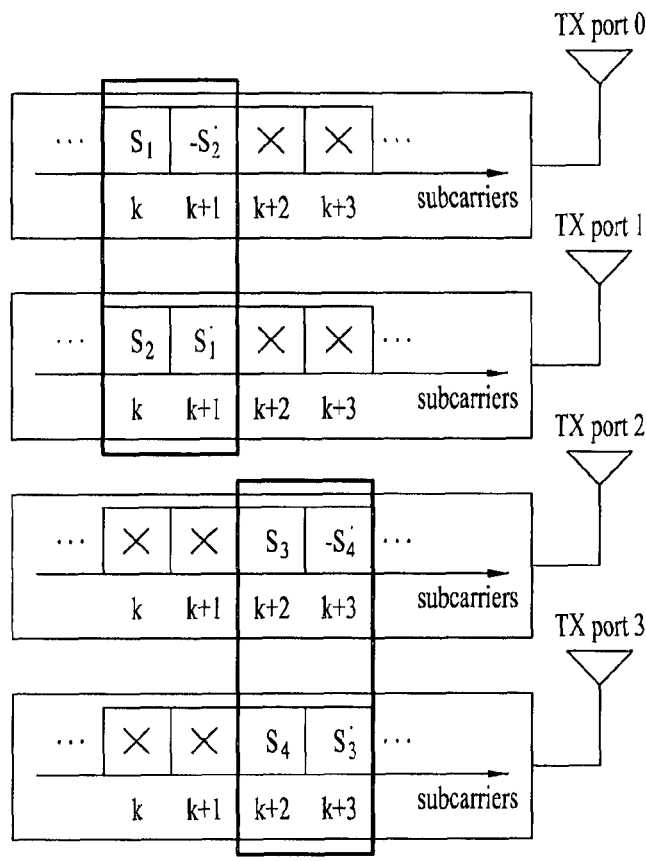

The transmit diversity scheme applicable to an OFDM frame structure includes Space Frequency Block Code (SFBC), a combination of SFBC and frequency switching transmit diversity (FSTD), etc., and FIG. 15 illustrates transmit diversity schemes for the common control channel, applicable to the first embodiment of the present invention. Specifically, FIG. 15(a) illustrates SFBC, and FIG. 15(b) illustrates a combination of SFBC and FSTD.

Alternatively, when the beamforming scheme is applied to data transmission on the common control channel and the UE-specific control channel, the same RS configuration may be used. For example, when the beamforming scheme is used for data transmission on all control channels, since information of the common control channel should be received by all UEs irrespective of locations of the UEs, if the common control channel and the UE-specific control channel have the same RS configuration and the beamforming scheme is applied, the common control channel may generate a beam in the form of an identity matrix.

For example, when two RS antenna ports are used, a precoding matrix of [Equation 8] is applicable to data transmission on the common control channel, and a precoding matrix of [Equation 9] is applicable to data transmission on the UE-specific control channel. Specifically, the precoding matrix of [Equation 8] is configured as an identity matrix.

$$\frac{1}{\sqrt{2}}\begin{bmatrix} 1 & 0 \\ 0 & 1 \end{bmatrix} \qquad \text{[Equation 8]}$$

$$\frac{1}{2}\begin{bmatrix} 1 & 1 \\ 1 & -1 \end{bmatrix}, \ \frac{1}{2}\begin{bmatrix} 1 & 1 \\ j & -j \end{bmatrix}, \qquad \text{[Equation 9]}$$

Embodiment 2

In the second embodiment of the present invention, it is proposed that, in a high-frequency band, the control channels occupy only a part of the whole transmission band, and occupy only a part of a Transmission Time Interval (TTI).

Figure 16:
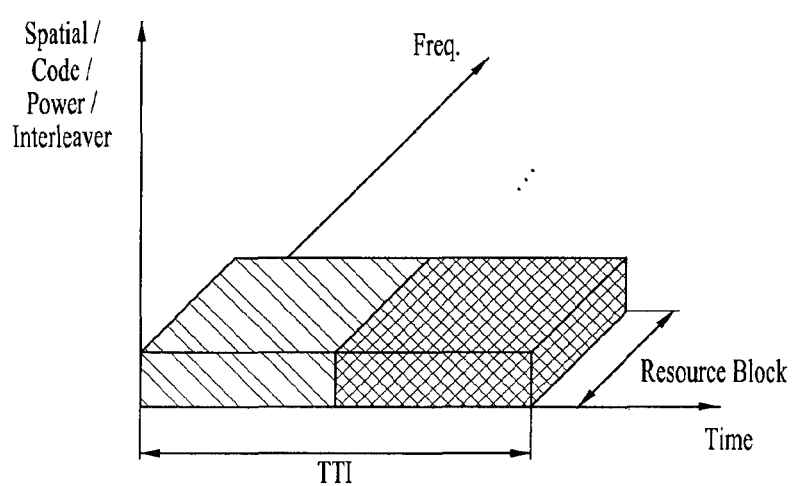
FIG. 16 illustrates an example wherein a common control channel and a UE-specific control channel are formed as partial time areas, according to a second embodiment of the present invention.
Figure 16:
Figure 16:

FIG. 16 illustrates an example wherein the common control channel and the UE-specific control channel are formed as partial time areas, according to the second embodiment of the present invention.

Referring to FIG. 16, the common control channel and the UE-specific control channel may divide and allocate a TTI or a subframe into a predetermined number (e.g., N) of periods. As such, the number of control channels multiplexed in a single resource may be increased and thus frequency efficiency may be increased.

Embodiment 3

In the third embodiment of the present invention, it is proposed to multiplex the common control channel and the UE-specific control channel in the same physical region.

The common control channel and the UE-specific control channel have the same physical channel structure, and thus may be multiplexed in the same resource region. The multiplexing scheme includes OFDMA-based multiplexing, space region multiplexing, code region multiplexing, power region multiplexing, interleaver region multiplexing, etc.

Two representative schemes for multiplexing control channels are proposed by the present invention. First, a common control channel is not multiplexed with general UE-specific control channels. Second, the common control channel is multiplexed with general UE-specific control channels.

Figure 17:
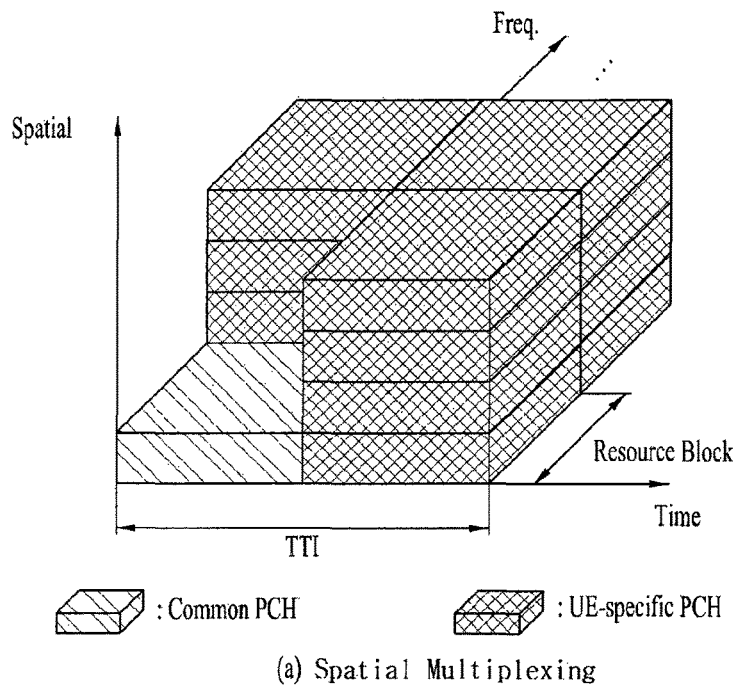
FIG. 17 illustrates an example wherein a common control channel and UE-specific control channels are multiplexed but the common control channel is not multiplexed with the UE-specific control channels, according to a third embodiment of the present invention.
Figure 17:
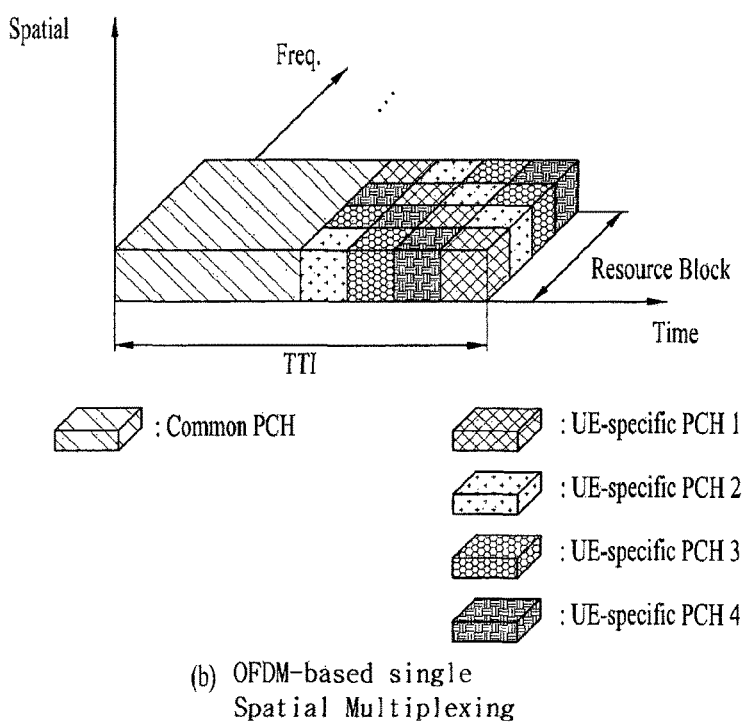

FIG. 17 illustrates an example wherein a common control channel and UE-specific control channels are multiplexed but the common control channel is not multiplexed with the UE-specific control channels, according to the third embodiment of the present invention. Specifically, FIG. 17A illustrates an example wherein the UE-specific control channels are multiplexed using spatial multiplexing, and FIG. 17B illustrates an example wherein the UE-specific control channels are multiplexed using OFDM-based single spatial multiplexing, that is, simultaneously using time division multiplexing and frequency division multiplexing.

Figure 18:
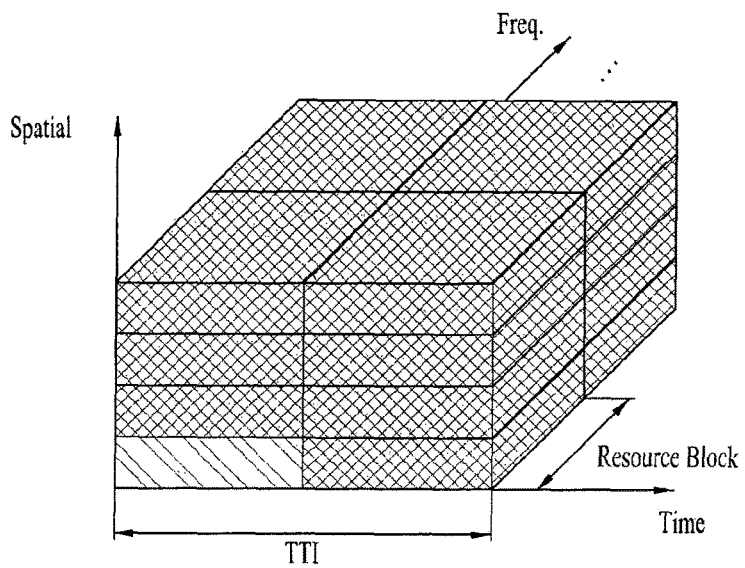
FIG. 18 illustrates an example wherein a common control channel and UE-specific control channels are multiplexed and the common control channel is multiplexed with the UE-specific control channels, according to the third embodiment of the present invention.
Figure 18:
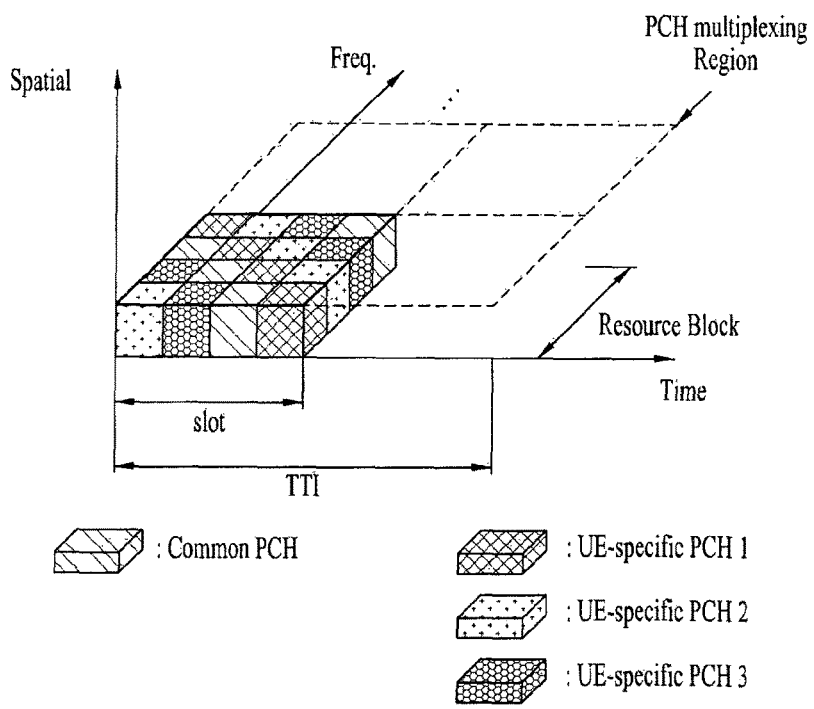

FIG. 18 illustrates an example wherein a common control channel and UE-specific control channels are multiplexed and the common control channel is multiplexed with the UE-specific control channels, according to the third embodiment of the present invention. Specifically, FIG. 18A illustrates an example wherein the UE-specific control channels are multiplexed using spatial multiplexing, and FIG. 18B illustrates an example wherein the UE-specific control channels are multiplexed using OFDM-based single spatial multiplexing, that is, simultaneously using time division multiplexing and frequency division multiplexing.

In addition, channel estimation methods may be classified according to a multiplexing method into a channel estimation method for applying orthogonal RSs and a channel estimation method for applying the same RS.

Specifically, when multiplexed control channels are detected, channel estimation for applying orthogonal RSs to the multiplexed control channels should be allowed. For example, when OFDMA-based or IDMA-based spatial multiplexing is used, channel estimation for applying orthogonal RSs is allowed.

In addition, the channel estimation method for applying the same RS is applicable when code division multiplexing is used. That is, all multiplexed control channels may be detected using the same RS, and individual control channels may be detected by performing despreading.

The number N of control channels to be multiplexed may be set by a network and may be notified to UEs. Specifically, when N for a common control channel region is set to 1, in a corresponding physical region, data transmission may be performed on only one common control channel.

A method for design of and data transmission on control channels appropriate for a communication environment using a wideband in a high-frequency band has been described above. In general, the control channels may be divided into a common control channel for delivering information that should be received by all UEs after the UEs achieve initial DL synchronization, and individual control channels for individually delivering scheduling control information after the UEs achieve synchronization. However, in order to ensure service coverage and to increase frequency efficiency with a wider transmission band and a lower transmission power for data transmission in a high-frequency band, a new design of control channels appropriate for initial access of UEs and continuously accessed UEs is required. Therefore, the control channel structure proposed by the present invention is appropriate for high-frequency wideband communication, and is applicable to a small cell as well as a general macro cell.

Figure 19:
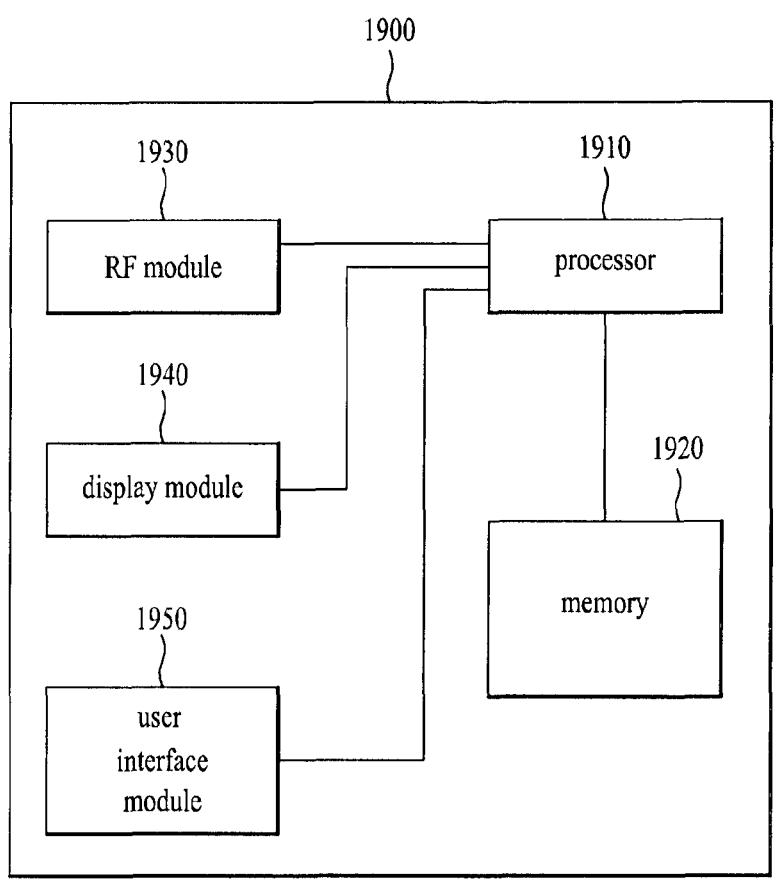
FIG. 19 is a block diagram of a communication apparatus according to an embodiment of the present invention.

FIG. 19 is a block diagram of a communication apparatus according to an embodiment of the present invention.

Referring to FIG. 19, a communication apparatus 1900 includes a processor 1910, a memory 1920, an RF module 1930, a display module 1940, and a User Interface (UI) module 1950.

The communication device 1900 is shown as having the configuration illustrated in FIG. 19, for the convenience of description. Some modules may be added to or omitted from the communication apparatus 1900. In addition, a module of the communication apparatus 1900 may be divided into more modules. The processor 1910 is configured to perform operations according to the embodiments of the present invention described before with reference to the drawings. Specifically, for detailed operations of the processor 1910, the descriptions of FIGS. 1 to 22 may be referred to.

The memory 1920 is connected to the processor 1910 and stores an Operating System (OS), applications, program codes, data, etc. The RF module 1930, which is connected to the processor 1910, upconverts a baseband signal to an RF signal or downconverts an RF signal to a baseband signal. For this purpose, the RF module 1930 performs digital-to-analog conversion, amplification, filtering, and frequency upconversion or performs these processes reversely. The display module 1940 is connected to the processor 1910 and displays various types of information. The display module 1940 may be configured as, not limited to, a known component such as a Liquid Crystal Display (LCD), a Light Emitting Diode (LED) display, and an Organic Light Emitting Diode (OLED) display. The UI module 1950 is connected to the processor 1910 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

INDUSTRIAL APPLICABILITY

A method and apparatus for data transmission on control channels from a Base Station (BS) to User Equipments (UEs) in a wireless communication system has been described above as being applied to a 3rd Generation Partnership Project Long Term Evolution (3GPP LTE) system, but is also applicable to various wireless communication systems other than the 3GPP LTE system.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A method for data transmission on control channels from a Base Station (BS) to a User Equipment (UE) in a wireless communication system, the method comprising:
    multiplexing a common control channel and a UE-specific control channel for the UE using at least one of time division multiplexing and frequency division multiplexing,
    wherein the common control channel and the UE-specific control channel are code-division-multiplexed or spatial-multiplexed on the same time-frequency resources; and
    performing data transmission on the multiplexed common control channel and the UE-specific control channel to the UE,
    wherein a Reference Signal (RS) configuration for estimating the common control channel is equal to an RS configuration for estimating the UE-specific control channel, and
    wherein the UE-specific control channel is multiplexed with one or more UE-specific control channels for other UEs using at least one of time division multiplexing, frequency division multiplexing, spatial multiplexing, and code division multiplexing.

2. The method according to claim 1, further comprising applying a precoder for beamforming to the common control channel and the UE-specific control channel,
    wherein the precoder for beamforming uses an identity matrix.

3. A Base Station (BS) apparatus in a wireless communication system, the BS apparatus comprising:
    a wireless communication module configured to transmit signals to and receive signals from a User Equipment (UE); and
    a processor configured to control the wireless communication module;
    wherein the processor is further configured to:
    multiplex a common control channel and a UE-specific control channel for the UE using at least one of time division multiplexing and frequency division multiplexing,
    wherein the common control channel and the UE-specific control channel are code-division-multiplexed or spatial-multiplexed on the same time-frequency resources, and
    control the wireless communication module to perform data transmission on the multiplexed common control channel and the UE-specific control channel to the UE,
    wherein a Reference Signal (RS) configuration for estimating the common control channel is equal to an RS configuration for estimating the UE-specific control channel, and
    wherein the processor multiplexes the UE-specific control channel with one or more UE-specific control channels for other UEs using at least one of time division multiplexing, frequency division multiplexing, spatial multiplexing, and code division multiplexing.

4. The BS apparatus according to claim 3, wherein the processor applies a precoder for beamforming to the common control channel and the UE-specific control channel, and wherein the precoder for beamforming uses an identity matrix.

* * * * *